US011841882B2

United States Patent
Gawrys et al.

(10) Patent No.: US 11,841,882 B2
(45) Date of Patent: Dec. 12, 2023

(54) INDIVIDUALIZED TELEMETRY PROCESSING LEVERAGING DIGITAL TWINS PROPERTY(IES) AND TOPOLOGICAL METADATA

(71) Applicant: Microsoft Technology Licensing, LLC, Redmond, WA (US)

(72) Inventors: Stefan Krzysztof Gawrys, Seattle, WA (US); Patrick James Gorman, Bellevue, WA (US); Andres Carlo Petralli, Redmond, WA (US); Daniel Escapa, Seattle, WA (US); Alina Mihaela Stanciu, Redmond, WA (US); David John Brennan, Redmond, WA (US); Grégory Christopher John Vandenbrouck, Bellevue, WA (US); Hubert Van Hoof, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 848 days.

(21) Appl. No.: 16/199,059

(22) Filed: Nov. 23, 2018

(65) Prior Publication Data
US 2020/0097493 A1    Mar. 26, 2020

Related U.S. Application Data

(60) Provisional application No. 62/735,171, filed on Sep. 23, 2018.

(51) Int. Cl.
*G06F 16/332*  (2019.01)
*G06F 16/587*  (2019.01)
(Continued)

(52) U.S. Cl.
CPC .......... *G06F 16/3328* (2019.01); *G06F 16/20* (2019.01); *G06F 16/48* (2019.01); *G06F 16/587* (2019.01)

(58) Field of Classification Search
CPC .... G06F 16/3328; G06F 16/587; G06F 16/20; G06F 16/48
See application file for complete search history.

(56) References Cited

U.S. PATENT DOCUMENTS 6,523,172 B1 *  2/2003  Martinez-Guerra .... G06F 8/427
                                                        704/9
7,456,736 B2    11/2008  Primm et al.
(Continued)

FOREIGN PATENT DOCUMENTS

WO        2015130763 A1    9/2015

OTHER PUBLICATIONS

"Microsoft : Deep Dive into Azure IoT Hub Notifications and Device Twin Blog Microsoft Azure", Retrieved from: https://azure.microsoft.com/de-de/blog/deep-dive-into-azure-iot-hub-notifications-and-device-twin/, Oct. 26, 2017, 10 Pages.
(Continued)

*Primary Examiner* — Mohamed Abou El Seoud
*Assistant Examiner* — William P Bartlett
(74) *Attorney, Agent, or Firm* — Rainier Patents, P.S.

(57) ABSTRACT

Described herein is a system and method of processing data of a digital twins object model. Data associated with a node of the digital twins object model is parsed to identify metadata associated with the node. The data can comprise telemetry data received from an IoT device associated with the node. User-defined function(s) are determined that match the identified metadata. The data and metadata can be provided to the user-defined function(s). The determined user-defined function(s) are executed. Also described herein
(Continued)

is a method of creating a user-defined function for processing data of a digital twins object model. Information regarding business logic is received from a user defining a user-defined function. Information regarding telemetry condition(s) to which the user-defined function applies is received defining a matcher. The user-defined function and matcher are stored as objects within a spatial intelligence graph associated with the digital twins object model.

22 Claims, 7 Drawing Sheets

(51) Int. Cl.
  *G06F 16/20* (2019.01)
  *G06F 16/48* (2019.01)

(56) References Cited

U.S. PATENT DOCUMENTS

| | | | |
|---|---|---|---|
| 8,015,547 | B2 | 9/2011 | Harvey et al. |
| 2006/0143439 | A1 | 6/2006 | Arumugam et al. |
| 2013/0073576 | A1 | 3/2013 | Lillethun et al. |
| 2015/0341979 | A1* | 11/2015 | Gallo .................... H04W 84/18 702/189 |
| 2016/0247129 | A1 | 8/2016 | Song et al. |
| 2017/0099353 | A1 | 4/2017 | Arora et al. |
| 2018/0232459 | A1* | 8/2018 | Park ...................... G05B 15/02 |
| 2019/0138333 | A1* | 5/2019 | Deutsch ................. G06F 30/20 |
| 2019/0158309 | A1* | 5/2019 | Park ..................... H04L 12/2827 |
| 2020/0004862 | A1* | 1/2020 | Bauer ................ G06F 16/2291 |

OTHER PUBLICATIONS

Asenjo, et al., "Digital Twin—Modeling Interrelated Devices", Retrieved from: https://www.iiconsortium.org/news/joi-articles/2018-March_Digital_Twin_TCS.pdf, Mar. 2018, 11 Pages.

"International Search Report and Written Opinion Issued in PCT Application No. PCT/US2019/039115", dated Nov. 21, 2019, 11 Pages.

"Method Sensor Rules", Retrieved from https://www.dynatrace.com/support/doc/appmon/administration/sensor-configuration/method-sensor-rules/ , Oct. 4, 2018, 10 Pages.

McClintock, Colleen, "Learn How IoT Systems Make Real-time Decisions", Retrieved from https://www.sparklinglogic.com/iot-systems-make-realtime-decisions/ , Jul. 28, 2016, 4 Pages.

\* cited by examiner

INDIVIDUALIZED TELEMETRY PROCESSING LEVERAGING DIGITAL TWINS PROPERTY(IES) AND TOPOLOGICAL METADATA

RELATED APPLICATION

This application claims priority to U.S. Provisional Application No. 62/735,171, filed Sep. 23, 2018, entitled "Individualized Telemetry Processing Leveraging Digital Twins Property(ies) and Topological Metadata", the disclosure of which is hereby incorporated by reference herein in its entirety.

BACKGROUND

As computing systems have become less expensive and smaller, they have begun to proliferate to almost all areas of life. For example, Internet of Things (IoT) devices are network-connected devices that are placed in many physical spaces to enable people to interact with and gather information about their environment. For example, offices or homes may include numerous IoT devices that can be used to control locks, to manage indoor climate and receive climate information, to manage lighting and receive lighting information, to open and close doors, to perform cleaning functions, to control audio and/or video equipment, to provide voice interaction, to provide security and monitoring capabilities, etc. As such, IoT devices can process and generate vast amounts of information. Notably, IoT devices are not limited to use in structures such as offices or homes. For example, IoT devices may be used to track any manner of physical items (including, for example, animals such as livestock or pets), to monitor health of people or animals, and so forth.

As IoT devices proliferate, it is becoming increasingly difficult to manage the devices and their users, and to process the data they generate. Notably, it may often be difficult to intuitively manage and group such devices (e.g., based on physical space or synergistic functionality), to efficiently control these devices (including controlling user access), to efficiently access data associated with these devices, and/or to efficiently process data associated with these devices. For example, managing IoT devices could involve storing large amounts of data associated with the physical environment in which they exist (e.g., buildings with their floors, rooms, room types, objects the rooms, etc.). Similarly, large numbers of devices may also result in enormous amounts of generated data (e.g., sensor data) that may be difficult to manage and access, and to link to the physical environment.

SUMMARY

Described herein is a method of processing data of a digital twins object model, comprising: parsing data associated with a node of the digital twins object model to identify metadata associated with the node, wherein the data comprises telemetry received by a device associated with the node; determining at least one user-defined function that matches the identified metadata; providing the data and metadata to the at least one user-defined function; and, executing the determined at least one user-defined function.

Also described herein is a method, comprising: receiving information regarding business logic from a user defining a user-defined function; receiving information regarding telemetry condition(s) to which the user-defined function applies defining a matcher; and, storing the user-defined function and the matcher as objects within a spatial intelligence graph associated with the digital twins object model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
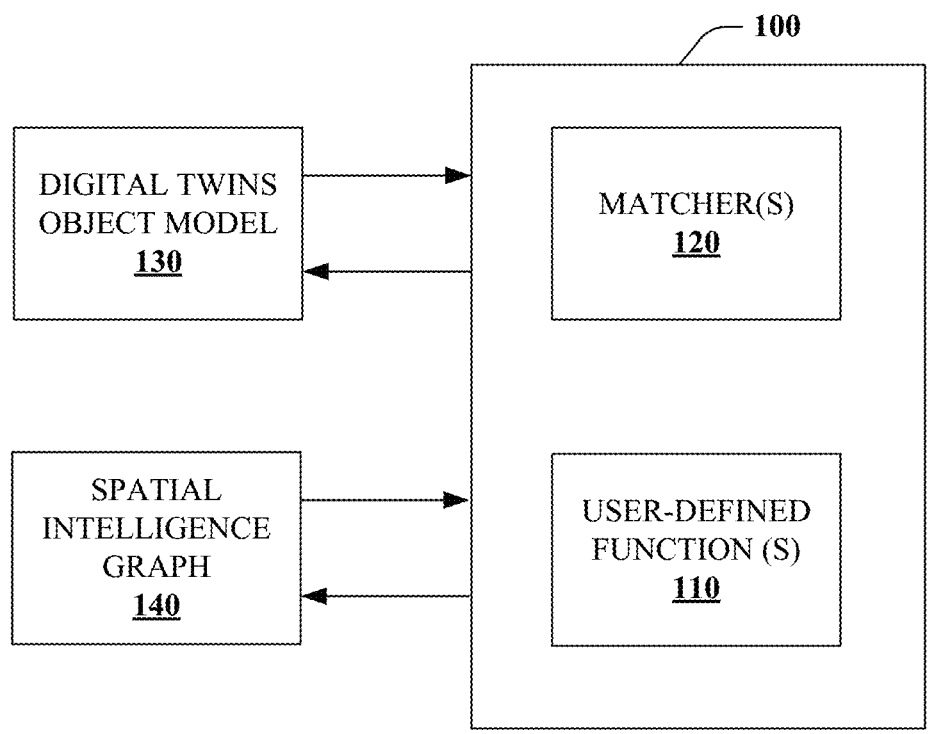
FIG. 1 is a functional block diagram that illustrates a system for processing data of a digital twins object model.

Various technologies pertaining to creation and/or use of user-defined function(s) and matcher(s) for processing of data of a digital twins object model are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding creation and/or use of user-defined function(s) and matcher(s) for processing of data of a digital twins object model. What follows are one or more exemplary systems and methods.

Aspects of the subject disclosure pertain to the technical problem of processing of data (e.g., telemetry message(s)) of a digital twins object model. The technical features associated with addressing this problem involve receiving information regarding business logic from a user providing a user-defined function, receiving information regarding telemetry condition(s) to which the user-defined function applies, and, storing the user-defined function as an object within a spatial intelligence graph associated with the digital twins object model. The technical features further include parsing data associated with a node of the digital twins object model to identify metadata associated with the node, wherein the data comprises telemetry received by a device associated with the node; determining at least one user-defined function that matches the identified metadata; providing the data and metadata to the at least one user-defined function; and, executing the determined at least one user-defined function. Accordingly, aspects of these technical features exhibit technical effects of more efficiently and effectively processing data of a digital twins object model, for example, reducing response time and/or resource consumption.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Described herein is a system and method for creating and/or using user-defined function(s) for processing of data (e.g., telemetry message(s)) of a digital twins object model. A particular instance of the digital twins object model (sometimes referred to as "digital twins object model") is a virtual model of particular entity(ies) in the physical world and relationships between them. The digital twins object model allows for the definition of entity-specific (e.g., device-specific) metadata (e.g., property(ies)). Entity(ies) can further be queried for configuration and/or state information.

The digital twins object model allows for logical grouping of entity(ies) (e.g., objects) which can be hierarchically represented in a spatial intelligence graph. In some embodiments, the user-defined function(s) can be object(s) within the spatial intelligence graph. In this manner, a user has the ability to define user-provided computation as part of telemetry processing that is closely tied into the topology of the digital twins object model. For example, a user-defined function located at a root node can be given greater access to nodes than a user-defined function located in a subtree or leaf of the graph.

The system and method can allow users with large sensor and space topologies to define various sets of rules and logic against their sensor data and to apply the results to entities within a topology (or particular portion thereof). For example, user-defined functions can compute value(s) which are then applied to entity(ies) within the digital twins object model (e.g., affect a particular object of the digital twins object model).

Users are provided with an environment to author user-defined functions and organize them efficiently against a topology (digital twins object model/spatial intelligence graph). Users are provided with an environment for fast and scalable execution.

Referring to FIG. 1, a system for processing data of a digital twins object model 100 is illustrated. The system 100 includes one or more user-defined function(s) 110 and one or more matcher(s) 120. The system 100 receives information from an instance of a digital twins object model 130 and utilizes a spatial intelligence graph 140.

The digital twins object model is a computer model that allows for virtual modeling of entity(ies) (e.g., people, places, and/or devices) in the physical world and relationship(s) between them. The instance of the digital twins object model 130 describes domain-specific concept definitions, categories, and/or properties. In some embodiments, model(s) 130 are predefined by customers who are looking to customize the solution for their specific needs: smart spaces, buildings, energy grids, factories, etc. As used herein, "endpoints" refer to locations within a particular user's system where telemetry messages can be forwarded and/or where digital twins events can be sent, for example "Event Hub", "Service Bus", "Event Grid".

An instance of a domain-specific model 130 can also be referred as an "ontology". For example, a particular domain-specific model 130 may be tailored to a smart building solution, and so it would describe groupings like a region, venue, different floors of the venue, and then areas such as offices, zones, conference rooms, and focus rooms. Another particular domain-specific model 130 can be tailored towards an energy grid solution and would describe various substation types, energy resources, and customers.

In some embodiments, the domain-specific model 130 can simplify the creation of IoT solutions for smart spaces, buildings, cities, energy grids, etc. by packaging together the following capabilities:

1. Ontology and Topology: a way of describing spaces in the real world, and their relationships to one another;
2. Role-based Access Control (RBAC): the ability to specify which users have access to various parts of the solution;
3. IoT Device Data Ingress: a managed endpoint to which devices & sensors will send their data;
4. Data Processing via User-defined Functions (UDFs): the ability to run aggregations or other user-defined calculations on the data that is sent from devices & sensors;
5. Event and Notification Egress via Dispatcher: the ability to send a variety of events and notifications to specified endpoints for extending an IoT solution;
6. Spatial Intelligence Graph API: a rich REST API which provides programmatic control of all of the above (Swagger API and Usage).

Ontology and Topology

In an IoT solution, the ontology describes the concepts and categories within the solution, as well as their properties and the relationships between them. As noted above, one ontology may be tailored to a Smart Buildings solution while another ontology can be tailored towards an energy grid solution.

In some embodiments, the model 130 can support one or more categories of objects including, for example: spaces, devices, sensors, and/or users. "Spaces" correspond to virtual and/or physical locations, examples of space types are 'Tenant', 'Customer', 'Region', 'Venue'. In some embodiments, each space can have a type (e.g., region) and a name (e.g., Puget Sound). A given space may belong to another space (e.g., a neighborhood may belong to a floor) that in turn belongs to a venue, region, customer, etc. "Devices" are virtual and/or physical pieces of equipment. "Sensors" are objects that detect events (e.g., temperature, presence). "Users" are identifying occupants and their characteristics. For example, users can be attached to spaces.

In some embodiments, other categories of objects include resources, blobs, and/or extended types. "Resources" can be attached to a space and typically represent resources to be used by objects in the space graph, for example 'IoT Hub'. "Blobs" are attached to objects (such as spaces, devices, sensors, and users) and used as files with mime type and metadata, for example "maps", "pictures", "manuals". Extended Types" are extensible enumerations that augment entities with specific characteristics, for example "Space-Type", "Space Subtype". Ontologies can represent a set of extended types, for example "Default", "Building", "BACnet", "EnergyGrid". The specific characteristics can be used to filter or group entities by Type within the UI or within the data processor.

In some embodiments, the model 130 can support property(ies) associated with object(s). Objects can have custom in addition to built-in property(ies) (e.g., predefined). For example, Property Keys and Values are custom properties attached to objects (e.g., spaces, devices, sensors, and users) used in addition to the built-in ones, for example, "MaxAcceptableValueThreshold" as Key and "10" as Value.

Roles are permissions roles that are assigned to users used to grant privileges on the spatial graph, for example "Space Administrator", "User Administrator", "Device Administrator". Each role can have a set of permissions (e.g., Read, Write, and/or Update) that defines the privileges granted to a user.

Role Assignments correspond to the association between identifiers and roles, for example granting a user or a service principal permission to manage a space in the Spatial Intelligence Graph.

Security Key Stores are assigned to spaces to provide the security keys for all devices in the hierarchy under the Space object to allow the device to securely communicate with the Digital Twins service.

System APIs allow for managing system wide settings, such as the various available types of spaces and sensors.

User-Defined-Functions (UDF) 110 allow customizable sensor telemetry processing within the spatial graph 140. For example, a particular UDF can set a sensor reading on the sensor object, perform custom logic based on multiple sensor readings within the graph and set it to the space, attach additional metadata to the space and notify when certain conditions are met for incoming sensors readings. In some embodiments, for purposes of explanation and not limitation, UDFs can be written in JavaScript. Business logic can be expressed as a UDF. A UDF can thus be a piece of user supplied logic to be executed against incoming telemetry (e.g., from a sensor) that applies the results, for example, against an entity in the topology.

Figure 2:
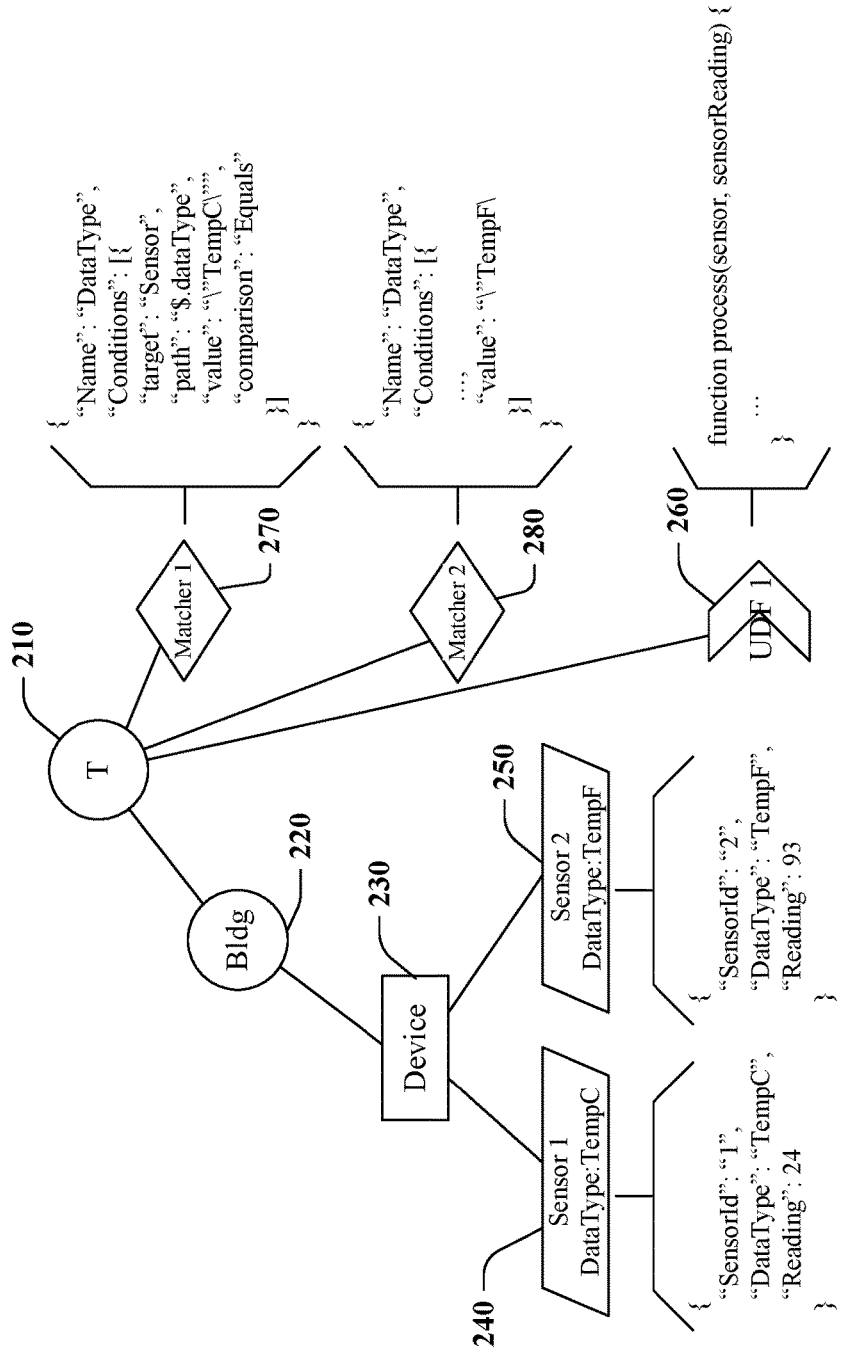
FIG. 2 is a spatial intelligence graph that illustrates an exemplary user-defined function and two matchers.

Referring briefly to FIG. 2, a spatial intelligence graph 200 illustrating an exemplary user-defined function and two matchers. In the graph 200, a root node ("T") 210 includes a child node "Bldg" 220 which has a child node "Device" 230. The device node 230 includes two sensors: "sensor 1" 240 and "sensor 2" 250. A user-defined function 260 and the two matchers: "matcher 1" 270 and "matcher 2" 280 are stored within the root node 210 of the graph 200.

For purposes of explanation and not limitation, an exemplary user-defined function to set a sensor telemetry reading directly for a sensor with data type "motion" is:

TABLE 1

```
function process(reading, telemetryContext) {
    setSensorValue(reading.SensorId, "Motion",
JSON.parse(reading.Message).Value);
}
```

Referring back to FIG. 1, in some embodiments, while a UDF has the ability to modify the digital twins object model topology, it itself is stored as an entity in the topology. This can have several advantages:

A UDF has a location within the tree that can be assigned meaning.

This allows other objects within a subtree of a UDF's location to become subject to the UDF.

A UDF is given an identity based on being an object in the topology.

Matchers 120 are objects that determine which UDFs 110, if any, will be executed for a given telemetry message. In some embodiments, matchers 120 are another object type that can be added to the topology (e.g., via the spatial intelligence graph 140). In some embodiments, the purpose of a particular matcher 120 is to filter the applicability of a UDF 110 to certain property(ies) of an object in the topology. For purposes of explanation and not limitation, an example for such a filter: Matcher (a) expresses the applicability of a UDF (b) to any sensor in the topology that carries a property of name "Type" equaling "Temperature". In a typical topology, the above Matcher (a) 120 allows a user to write business logic expressed as UDF (b) 110 for any temperature in the system. For example, the UDF 110 can contain such logic as enabling an HVAC system, if the temperature crosses a certain threshold.

Matchers 120 can express other constraints on properties and comparisons. For purposes of explanation and not limitation, properties can include:

A numeric property "MaxTemperature"

A boolean property "IsEnabled"

A string property "Color"

Matchers 120 can further express comparison(s), for example: "equals", "not equals", "contains", "greater than" or "lower than". For purposes of explanation and not limitation, in the examples discussed below, it is specified that "$.dataType" is to be matched with "equals" against a particular value for the expression to be true (e.g., matching a JsonPath expression). This means that telemetry resolved to any Digital Twin with a property of key "datatype" can be evaluated against the value given. In some embodiments, a Matcher 120 can match against a path of "$.Status" "equals" "active". Sensors that are Status disabled would not satisfy the matcher 120's condition. In some embodiments, a condition for the Matchers 120 can be against a "path" which is the JSON property to which the expression is applied. For purposes of explanation and not limitation, for example, the path can be expressed as a JSONPath Query. The user of a JSONPath Query to specify an applicable path can be powerful way for a user to utilize the configurability of the system 100. In some embodiments, another query language (e.g., XQuery or XPath) can be utilized which is appropriate to the particular object model.

Spatial Intelligence Graph

With the model 130 in place, the spatial intelligence graph 140 can be built. The spatial intelligence graph 140 is the specific way in which the different parts of the model 130 are related or arranged. The spatial intelligence graph 140 is a hierarchical graph of instances of objects, as discussed above. The spatial intelligence graph 140 can support inheritance, filtering, aggregation, an ability to traverse the spatial intelligence graph 140 upward and/or downward, scalability, and/or extensibility (e.g., a user can load their own ontology and/or extend various verticals/domains). In some embodiments, the spatial intelligence graph 140 exposes a collection of REST APIs for management and/or interaction with the graph 140 and/or a Swagger companion specification.

In some embodiments, a user becomes the tenant of a root note of a particular spatial intelligence graph 140 and automatically obtains full access to the entire graph 140. The user can then provision the graph 140 using the APIs.

Figure 3:
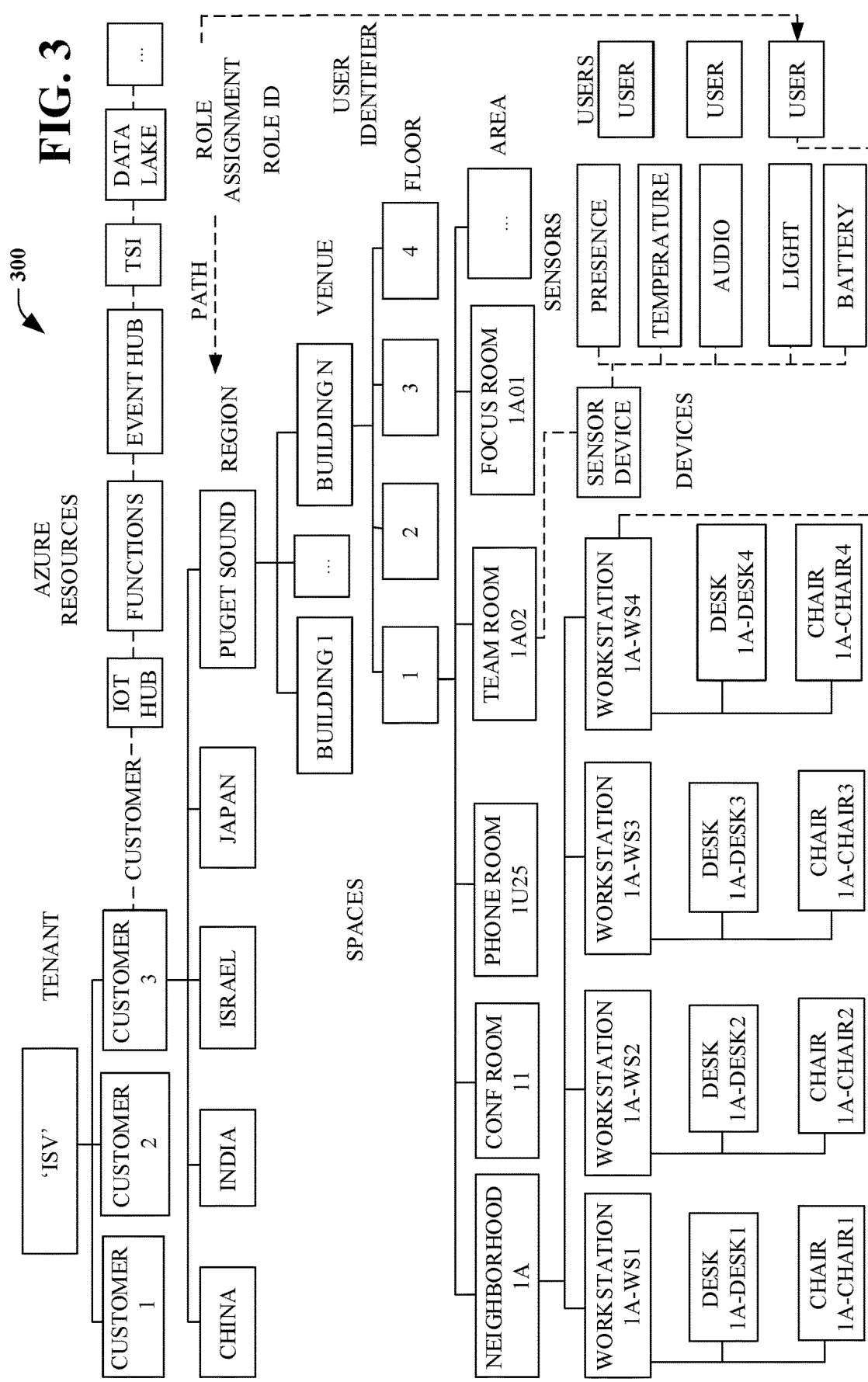
FIG. 3 is an exemplary spatial intelligence graph that illustrates a smart buildings ontology.

Referring briefly to FIG. 3, an exemplary spatial intelligence graph 300 illustrates a smart buildings ontology. The spatial graph 300 brings together spaces, devices, sensors, and users. Each is linked together in a way that models the real world: venue "Building n" has four floors, each with a variety of areas. Users are associated with their workstations and are given access to portions of the graph 300. Depending on a user's role, they may be a customer and be able to view building data, or they may be an administrator with rights to make changes to the spatial graph 300.

In some embodiments, the graph 300 can be navigated on depth, as well as on breadth. On depth, the graph 300 can be traversed top-down or bottom-up using navigation "traverse", "minLevel", "maxLevel" parameters and could be filtered by specific "spaceId" or other defined properties. On breadth, the graph 300 can be navigated to get sibling nodes directly attached to a parent space or one of its descendants. When querying an object, the user can obtain all related objects that have relationships to that object using "includes" parameter of the GET APIs.

Graph inheritance applies to inherited types if a role assignment is granted. In some embodiments, when a role is assigned to an identifier on a node, the identifier gains access rights to that node and all nodes below it. The identifier gains access to not only the properties for that node, but also inherited properties of the parent nodes up the chain. For example, the properties that allow for inheritance can include extended types and/or property keys.

Graph filtering can include support for filtering by list of spaces IDs, name, space types and subtypes, parent space, spaces associated with given user, sensor data types, property keys and values, traverse, minLevel, maxLevel, and other OData filter parameters.

Graph scalability allows for the ability of the system to handle real-world workloads representing, for example, a campus of buildings, each with thousands of devices and sensors.

Graph extensibility allows for the ability to extend the model with new types and ontologies, but also to add properties and values to enrich the instance of the digital twins model 130's data.

Role-Based Access Control (RBAC)

Securing an IoT solution is achieved via role-based access control (RBAC). A role assignment maps a user principal and a portion of the topology to a specific role. For instance, a role assignment for a user might grant read access to spaces, sensors, and other users within a particular building. A specific user may be granted multiple roles at different levels within the topology, and there are a number of default roles that can be provided. In addition to granting users access, RBAC is also used when authoring user-defined functions (UDFs) 110, in order to specify what parts of the topology a given UDF 110 is allowed to access and/or modify.

IoT Hub Device Ingress

An IoT solution relies on data from devices and sensors on which to operate. An IoTHub ingress resource should be created within the topology to allow devices to send messages to Digital Twins and/or the Spatial Intelligence Graph APIs. Once IoTHub resource has been created, and device and sensors have been registered within the topology, those devices can start sending data to Digital Twins object model 130 and/or the Spatial Intelligence Graph 140 APIs via, for example, the Azure IoT Device SDK. Digital Twins and/or the Spatial Intelligence Graph APIs requires that each piece of data it receives be associated with a particular sensor within the topology; this is how Digital Twins object model 130 and/or the Spatial Intelligence Graph 140 APIs ensures it can process and route the data in the proper way.

Data Processing Via User-Defined Functions (UDFs)

Figure 4:
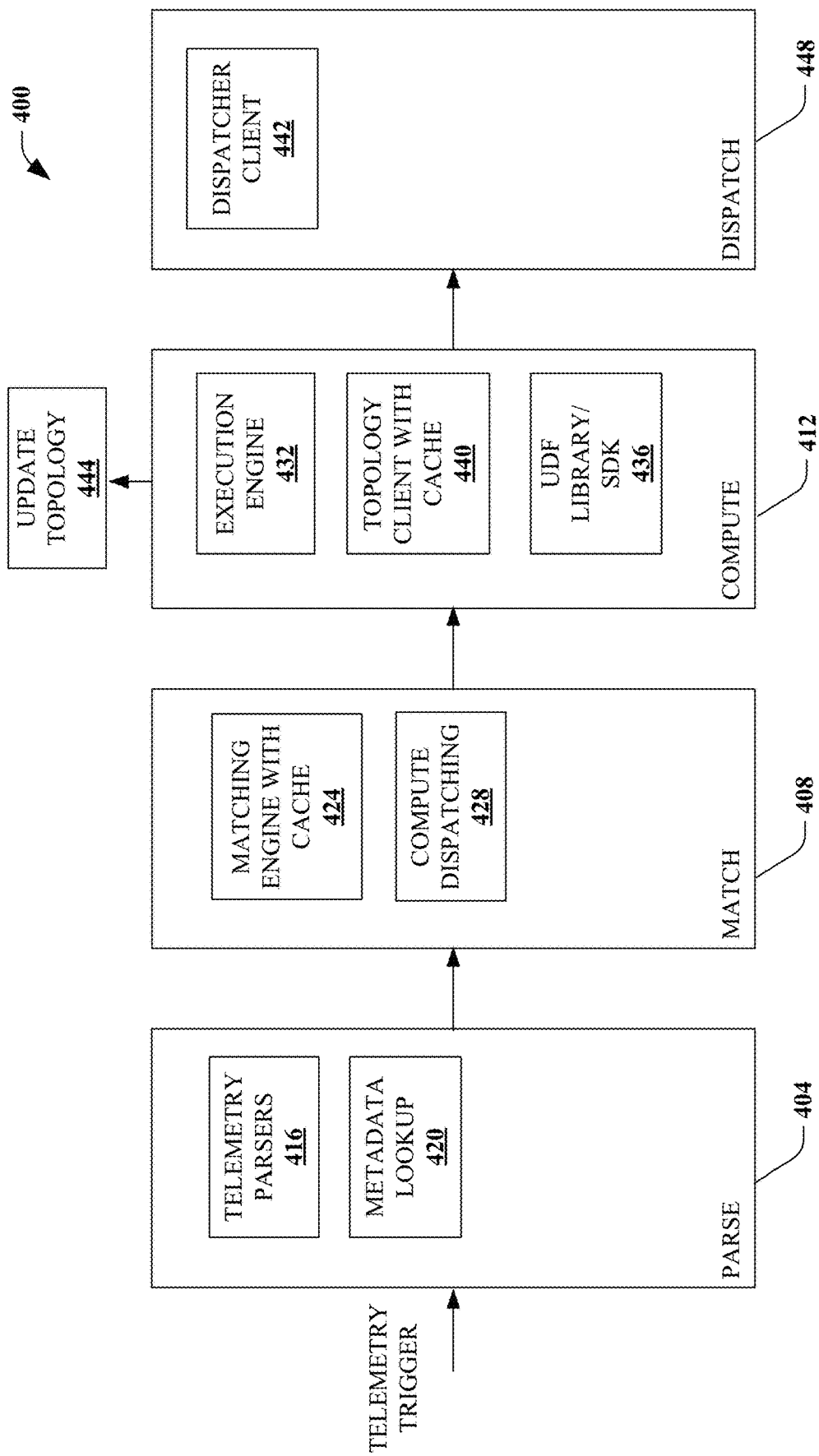
FIG. 4 is a functional block diagram that illustrates a data processor.

Turning to FIG. 4, a diagram of a data processor 400 is illustrated. The data processor 400 can be triggered by device telemetry from IoT Hub(s). The data processor 400 updates object(s) of the digital twins object model. Rules can be driven by telemetry DataType. The data processor 400 can update property(ies), for example, occupancy status, current temperature, etc. The data processor 400 can aggregate and propagate property(ies) across the digital twins object model topology. As noted above, the data processor 400 is extensible using user-defined function(s).

The data processor 400 can further notify (e.g., publish and/or subscribe) information to/from other object(s). For example, sensor and/or space updates can be forwarded to services such as an EventHub to Time Series Insights.

Once data is received from a device, for example, through an IoT Hub, data processing can take place. This processing can take place in three phases: parse 404, match 408, and compute 412. The parse phase 404 involves parsing the data 416 and looking up any metadata 420 associated with it such as the associated sensor from the spatial intelligence graph. The match phase 408 uses that metadata to match the data with an appropriate UDF 424 and compute dispatching 428. Finally, an execution engine 432 of the compute phase 412 runs any selected UDFs retrieved from a UDF library/SDK 436. The compute phase 412 can invoke a topology client with a cache 440 and/or update topology 444. In some embodiments, the cache 440 is optional and can be included for performance reasons. Optionally, the UDF can cause a dispatch phase 448 which utilizes a dispatcher client 452.

In some embodiments, a UDF is a JavaScript function that runs within an isolated environment and has access both to the sensor data as it was received, as well as to the topology and dispatcher. In some embodiments, the UDF further has access to notification dispatcher actions. In some embodiments, the UDF supports logging to support diagnosing and/or debugging of issue(s).

When new data from a sensor is received, a UDF may choose to calculate a moving average of the last few sensor readings, for instance. Once the UDF is registered within the topology, a Matcher must be created to specify when to run the UDF. A matcher specifies a condition on which to run a specific UDF.

The role assignments of the UDF is what tells the system which data the UDF itself can access. This access information is checked at the time that the UDF code itself asks the topology for data. The Matchers are responsible for deciding whether to invoke an UDF for a given piece of sensor telemetry, and this is checked when the telemetry is received but before the UDF execution has begun.

In some embodiments, it is possible for a Matcher to invoke a UDF that has no role assignments which would mean it would fail to read or write any data from the topology. It is also possible to give a UDF access to the whole topology, but fail to be invoked because it has no appropriate Matcher for a given piece of telemetry.

Exemplary Scenario of Using UDF

For purposes of explanation and not limitation, consider this very basic exemplary scenario. In a big conference room of a building there are multiple field devices sending motion, temperature, and carbon dioxide concentration telemetry data at various time intervals. For this exemplary scenario, as a solution developer or ISV, a UDF and matcher can be created to:

TABLE 2

1. Detect room occupancy based on multiple readings from multiple sensors
2. Define custom logic (User Defined Function) to analyze indoor air quality based on temperature and carbon dioxide concentration in correlation with the occupancy of the room
3. Generate a notification to send an email to a meeting organizer if poor air quality is detected (temperature above 73 degrees Fahrenheit, Carbon Dioxide concentration above 1000 parts per million) while the room is occupied.

Data Processor and UDFs

User-defined functions (UDFs) allow a user to process sensor telemetry in whichever way the user sees see fit. The user can define a particular UDF and a matcher that will determine when the particular UDF will be executed for a given telemetry message. In some embodiments, match condition comparisons include equal, not equal, and/or contains. In some embodiments, matcher condition targets include sensor, sensor device, and/or sensor space.

For the example of Table 2, a UDF and matcher can be defined acting on temperature, carbon dioxide and motion events to alert if there is poor air quality while the room is occupied by detecting motion, temperature above 73 degrees Fahrenheit, and carbon dioxide concentration above 1000 ppm. The following example matcher will evaluate to true on any sensor telemetry event with 'Temperature' as its data type. In some embodiments, three matchers can be created to match on Temperature, CarbonDioxide and Motion which can be posted one by one. For example:

TABLE 3

```
POST https://{{endpoint-management}}/api/v1.0/matchers
{
    "Name": "TemperatureMatcher",
    "Conditions": [
        {
            "target": "Sensor",
            "path": "$.dataType",
            "value": "\"Temperature\"",
            "comparison": "Equals"
        }
    ],
    "SpaceId": "d7c9c8c7-ab87-49c5-aca7-5f30802446ef"
}
POST https://{{endpoint-management}}/api/v1.0/matchers
{
    "Name": "CarbonDioxideMatcher",
    "Conditions": [
        {
            "target": "Sensor",
            "path": "$.dataType",
            "value": "\"CarbonDioxide\"",
            "comparison": "Equals"
        }
    ],
    "SpaceId": "d7c9c8c7-ab87-49c5-aca7-5f30802446ef"
}
```

TABLE 3-continued

```
POST https://{{endpoint-management}}/api/v1.0/matchers
{
    "Name": "MotionMatcher",
    "Conditions": [
        {
            "target": "Sensor",
            "path": "$.dataType",
            "value": "\"Motion\"",
            "comparison": "Equals"
        }
    ],
    "SpaceId": "d7c9c8c7-ab87-49c5-aca7-5f30802446ef"
}
```

In some embodiments, in order to upload the user-defined function, a POST call on the UserDefinedFunctions API can be made to create a UDF and attach it to a Space. An exemplary UDF is created with the following REST API call:

TABLE 4

```
Content-Type: multipart/form-data; boundary="userDefinedBoundary"
POST https://{{endpoint-management}}/api/v1.0/userdefinedfunctions
--userDefinedBoundary
Content-Type: application/json; charset=utf-8
Content-Disposition: form-data; name="metadata"
{
    "SpaceId": "d7c9c8c7-ab87-49c5-aca7-5f30802446ef",
    "Name": "User Defined Function",
    "Description": "The contents of this udf will be executed when matched against incoming telemetry.",
    "Matchers": ["f29cca8b-ef61-4eae-834c-80a257890530"]
}
--userDefinedBoundary
Content-Disposition: form-data; name="contents";
filename="userDefinedFunction.js"
Content-Type: text/javascript
var co2Type = "CarbonDioxide";
var temperatureType = "Temperature";
var motionType = "Motion";
var spaceAirQuality = "AirQuality";
function process(sensorReadingData, executionContext) {
    // Log SensorId and SensorReading
    log(` Sensor ID: ${sensorReadingData.SensorId}. `);
    log(` Sensor reading data value:
${JSON.parse(sensorReadingData.Message).Value}
    // Retrieve the sensor metadata down from the topology.
    var sensorMetadata =
getSensorMetadata(sensorReadingData.SensorId);
    // Set the sensor reading as the current value for the sensor.
    setSensorValue(sensorReadingData.SensorId,
sensorMetadata.DataType,
${JSON.parse(sensorReadingData.Message).Value});
    // Get parent space
    var parentSpace = sensorMetadata.Space( );
    // Get children sensors from the same space
    var otherSensors = parentSpace.ChildSensors( );
    var carbonDioxideThreshold = 1000.0;
    var temperatureThreshold = 73;
    // Retrieve C02, temperature and motion sensors
    var co2Sensor = otherSensors.find(function(element) {
        return element.DataType === co2Type;
    }),
    var tempSensor = otherSensors.find(function(element) {
        return element.DataType === temperature Type;
    });
    var motionSensor = otherSensors.find(function(element) {
        return element.DataType === motionType;
    });
    // get latest values for above sensors
    var motionVal = motionSensor.Value( ).Value;
    var presence = !!motionVal && motionVal.toLowerCase( ) === "true";
    var temperature = getFloatValue(tempSensor.Value( ).Value);
    var co2 = getFloatValue(co2Sensor.Value( ).Value);
    // Set OccupancyStatus for the space
```

TABLE 4-continued

```
    if (presence) {
        setSpaceValue(parentSpace.Id, "OccupancyStatus",
        "Occupied");
    }
    else {
        setSpaceValue(parentSpace.Id, "OccupancyStatus",
        "Unoccupied");
    }
    // Return if no temperature or C02 found
    if(temperature === null || co2 === null) {
            return;
    }
    // If temp greater threshold and C02 greater than threshold and
presence in the room => log, notify and set parent space computed
value
    if(temperature > temperatureThreshold && co2 >
            carbonDioxideThreshold && presence) {
            log(' Indoor air quality levels are poor. Temperature:
${tempSensor.Value( ).Value}. Carbon Dioxide:
${co2Sensor.Value( ).Value}. Presence: ${presence}. ');
            setSpaceValue(parentSpace.Id, spaceAirQuality, "bad");
            // Set up custom notification for air quality
            parentSpace.Notify(JSON.stringify("Air quality is poor."));
    }
    else {
            log(' Indoor air quality levels are good. Temperature:
                ${tempSensor.Value( ).Value}. Carbon Dioxide:
                ${co2Sensor.Value( ).Value}. Presence:
                ${presence}. ');
            setSpaceValue(parentSpace.Id, spaceAirQuality, "good");
    }
}
function getFloatValue(str) {
    if(!str) {
            return null;
    }
    return parseFloat(str);
}
```

Create a Role Assignment

In some embodiments, once the UDF has been created, a role assignment for the UDF to execute under is created in order to ensure the UDF has the proper permissions to interact with the Management API to perform actions on topology objects. The actions that the UDF performs are not exempt from the role-based access control within the system APIs. They can be limited in scope by specifying certain roles, or certain access control paths.

Because a UDF is given an identity, the system can restrict data access of a UDF based on the existing Role Based Access Control system (RBAC). For instance, this allows an author of a UDF to restrict access to a particular floor of a building and prevent a UDF to access other floor's spaces, whether by accident or malice. By having its own identity, a UDF can authenticate against the system without being tied to the lifetime of an identity that may be issued temporarily, such as a human user's identity which may only be granted for a particular timespan, e.g. for as long as a person is working on a particular project. This allows the operators of the system to manage the access level of a UDF individually with more fine grained control. In some embodiment, every UDF in a system can be granted different levels of access. Furthermore, by allowing the UDF to exist in the Digital Twins topology, it itself is subject to the rules of RBAC when users of the system wish to manage it.

Use of UDFs and Matcher(s) by Data Processor

Telemetry generated by the sensor described in the topology will trigger the execution of the UDF by the matcher. Once the telemetry is picked up by the Data Processor, an execution plan is created for the invocation of the UDF. For example:

1. Retrieve the matchers for the sensor the reading was generated from.
2. Depending on what matchers evaluated successfully, retrieve the associated user-defined functions.
3. Execute each UDF.

Matcher Example

For purposes of explanation and not limitation, an example matcher can be defined as follows:

TABLE 5

```
POST https://ManagementUri/api/v1.0/matchers
{
    "Name": "TemperatureMatcher",
    "Conditions": [
    {
        "target": "Sensor",
        "path": "$.dataType",
        "value": "\"Temperature\"",
        "comparison": "Equals"
    }
    ],
    "SpaceId": "d7c9c8c7-ab87-49c5-aca7-5f30802446ef"
}
```

UDF Example

For purposes of explanation and not limitation, an example user-defined function can be defined as follows:

TABLE 6

```
POST https://ManagementUri/api/v1.0/userdefinedfunctions HTTP/1.1
Content-Type: multipart/form-data; boundary="userDefinedBoundary"
--userDefinedBoundary
Content-Type: application/json; charset=utf-8
Content-Disposition: form-data; name="metadata"
{
    "SpaceId": "d7c9c8c7-ab87-49c5-aca7-5f30802446ef",
    "Name": "User Defined Function",
    "Description": "The contents of this udfwill be executed when
matched against incoming telemetry.",
    "Matchers": ["f29cca8b-ef61-4eae-834c-80a257890530"]
}
--userDefinedBoundary
Content-Disposition: form-data; name="contents";
filename="userDefinedFunction.js"
Content-Type: text/javascript
function process(sensor, sensorReading) {
    // User code goes here
}
--userDefinedBoundary--
```

Figure 5:
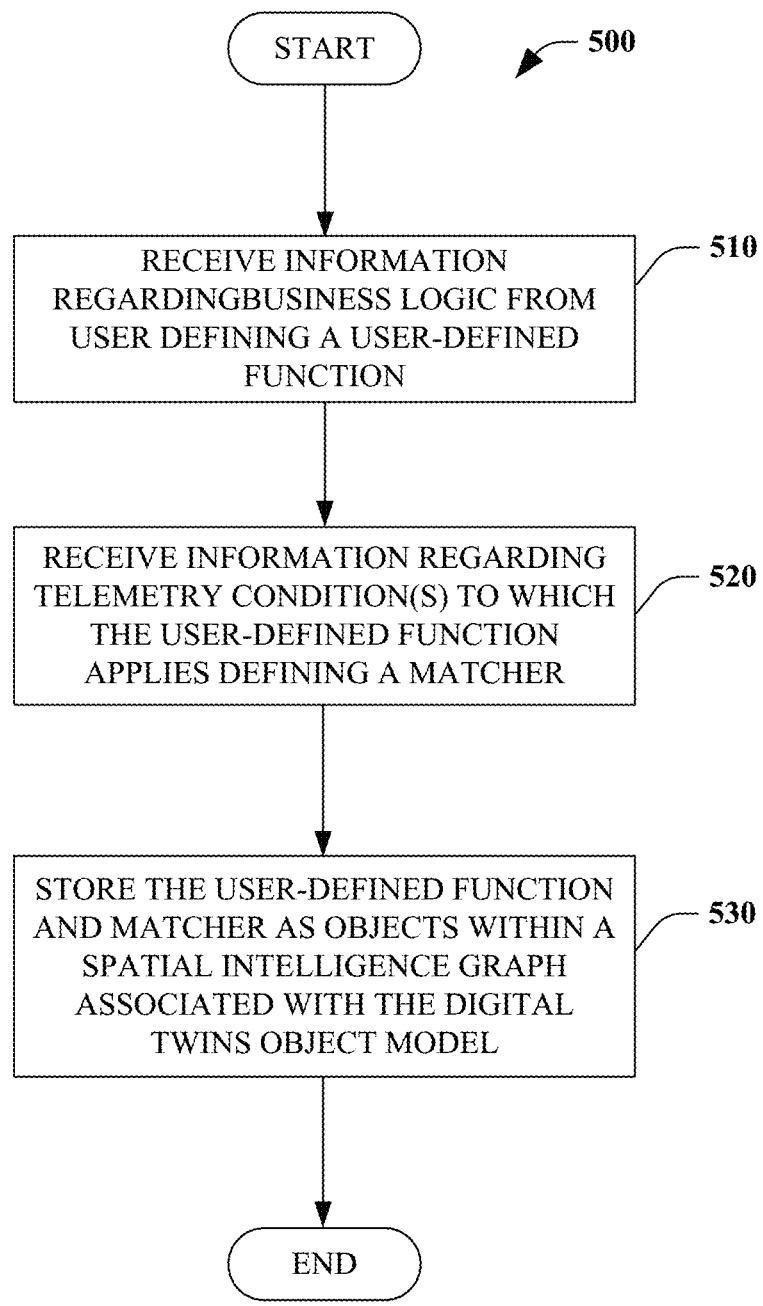
FIG. 5 is a flow chart that illustrates a method of creating a user-defined function for processing data of a digital twins object model.
Figure 6:
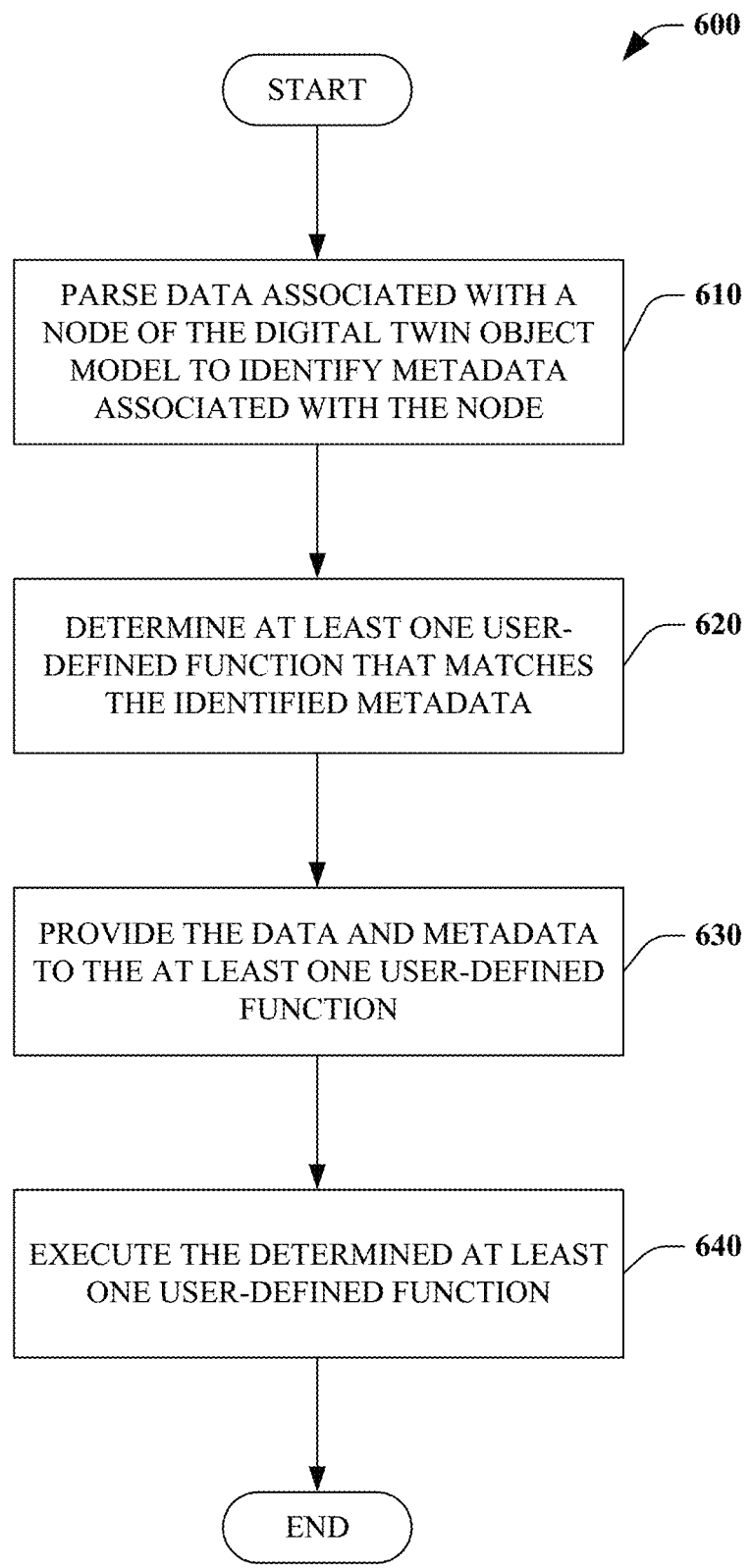
FIG. 6 is a flow chart that illustrates a method of processing data of a digital twins object model using user-defined function(s).

FIGS. 5 and 6 illustrate exemplary methodologies relating to processing data of a digital twins object model using user-defined function(s). While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 5, a method of creating a user-defined function for processing data of a digital twins object model 500 is illustrated. In some embodiments, the method 500 is performed by the system 100.

At 510, information regarding business logic is received from a user to define a user-defined function. At 520, information regarding telemetry condition(s) to which the user-defined function applies is received. This information is stored in one or more matchers. At 530, the user-defined function and matcher(s) are stored as objects within a spatial intelligence graph associated with the digital twins object model.

Turning to FIG. 6, a method of processing data of a digital twins object model using user-defined function(s) 600 is illustrated. In some embodiments, the method 600 is performed by the system 100.

At 610, data associated with a node of the digital twins object model is parsed to identify metadata associated with the node. The data can comprise telemetry received by a device associated with the node (e.g., an IoT device). At 620, at least one user-defined function is determined that matches the identified metadata. At 630, the data and metadata are provided to the at least one user-defined function. At 640, the determined at least one user-defined function is executed.

Described herein is a method of processing data of a digital twins object model, comprising: parsing data associated with a node of the digital twins object model to identify metadata associated with the node, wherein the data comprises telemetry received by a device associated with the node; determining at least one user-defined function that matches the identified metadata; providing the data and metadata to the at least one user-defined function; and executing the determined at least one user-defined function.

The method can include wherein the digital twins object model comprises a spatial intelligence graph that defines a hierarchical relationship of objects of the digital twins object model. The method can include wherein the at least one user-defined function is stored as a node in the spatial intelligence graph. The method can include wherein executing the determined at least one user-defined function includes calculating a computed value based on the parsed data.

The method can include wherein executing the determined at least one user-defined function further includes affecting at least one node of the digital twins object model. The method can include wherein the at least one user-defined function has an associated role that defines access rights to one or more nodes of the digital twins object model. The method can include wherein determining the at least one-user defined function that matches the identified metadata is further based on the access rights defined by the associated role. The method can include wherein the digital twins object model is a virtual model of particular entities in the physical world and relationships between the entities.

The method can include receiving information regarding business logic from a user defining a particular user-defined function; receiving information regarding telemetry condition(s) to which the particular user-defined function applies defining a matcher; and storing the particular user-defined function and the matcher as objects within a spatial intelligence graph associated with the digital twins object model.

Described herein is a system for processing data of a digital twins object model, comprising: a computer comprising a processor and a memory having computer-executable instructions stored thereupon which, when executed by the processor, cause the computer to: parse data associated with a node of the digital twins object model to identify metadata associated with the node, wherein the data comprises telemetry received by a device associated with the node; determine at least one user-defined function that matches the identified metadata; provide the data and metadata to the at least one user-defined function; and execute the determined at least one user-defined function.

The system can include wherein the digital twins object model comprises a spatial intelligence graph that defines a hierarchical relationship of objects of the digital twins object model. The system can include wherein the at least one user-defined function is stored as a node in the spatial intelligence graph. The system can include wherein executing the determined at least one user-defined function includes calculating a computed value based on the parsed data.

The system can include wherein executing the determined at least one user-defined function further includes affecting at least one node of the digital twins object model. The system can include, wherein the at least one user-defined function has an associated role that defines access rights to one or more nodes of the digital twins object model.

Described herein is a computer storage media storing computer-readable instructions that when executed cause a computing device to: parse data associated with a node of the digital twins object model to identify metadata associated with the node, wherein the data comprises telemetry received by a device associated with the node; determine at least one user-defined function that matches the identified metadata; provide the data and metadata to the at least one user-defined function; and execute the determined at least one user-defined function.

The computer storage media can further include wherein the digital twins object model comprises a spatial intelligence graph that defines a hierarchical relationship of objects of the digital twins object model. The computer storage media can further include wherein the at least one user-defined function is stored as a node in the spatial intelligence graph. The computer storage media can further include wherein executing the determined at least one user-defined function includes calculating a computed value based on the parsed data. The computer storage media can further include wherein the at least one user-defined function has an associated role that defines access rights to one or more nodes of the digital twins object model.

Figure 7:
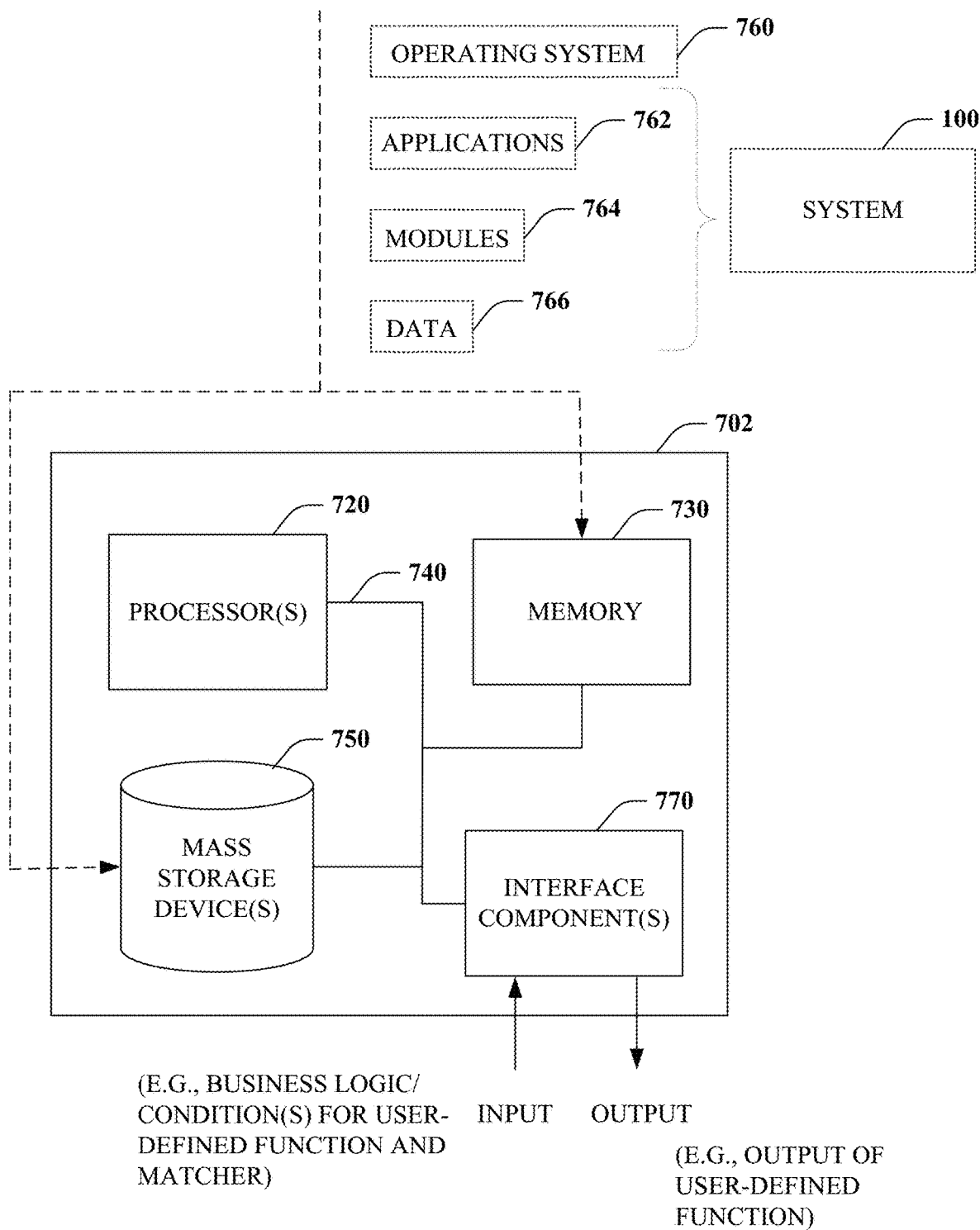
FIG. 7 is a functional block diagram that illustrates an exemplary computing system.

With reference to FIG. 7, illustrated is an example general-purpose computer or computing device 702 (e.g., mobile phone, desktop, laptop, tablet, watch, server, handheld, programmable consumer or industrial electronics, set-top box, game system, compute node, etc.). For instance, the computing device 702 may be used in a system for processing data of a digital twins object model 100.

The computer 702 includes one or more processor(s) 720, memory 730, system bus 740, mass storage device(s) 750, and one or more interface components 770. The system bus 740 communicatively couples at least the above system constituents. However, it is to be appreciated that in its simplest form the computer 702 can include one or more processors 720 coupled to memory 730 that execute various computer executable actions, instructions, and or components stored in memory 730. The instructions may be, for instance, instructions for implementing functionality described as being carried out by one or more components discussed above or instructions for implementing one or more of the methods described above.

The processor(s) 720 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 720 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 720 can be a graphics processor.

The computer 702 can include or otherwise interact with a variety of computer-readable media to facilitate control of the computer 702 to implement one or more aspects of the claimed subject matter. The computer-readable media can be any available media that can be accessed by the computer 702 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 702. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 730 and mass storage device(s) 750 are examples of computer-readable storage media. Depending on the exact configuration and type of computing device, memory 730 may be volatile (e.g., RAM), non-volatile (e.g., ROM, flash memory, etc.) or some combination of the two. By way of example, the basic input/output system (BIOS), including basic routines to transfer information between elements within the computer 702, such as during start-up, can be stored in nonvolatile memory, while volatile memory can act as external cache memory to facilitate processing by the processor(s) 720, among other things.

Mass storage device(s) 750 includes removable/non-removable, volatile/non-volatile computer storage media for storage of large amounts of data relative to the memory 730. For example, mass storage device(s) 750 includes, but is not limited to, one or more devices such as a magnetic or optical disk drive, floppy disk drive, flash memory, solid-state drive, or memory stick.

Memory 730 and mass storage device(s) 750 can include, or have stored therein, operating system 760, one or more applications 762, one or more program modules 764, and data 766. The operating system 760 acts to control and allocate resources of the computer 702. Applications 762 include one or both of system and application software and can exploit management of resources by the operating system 760 through program modules 764 and data 766 stored in memory 730 and/or mass storage device (s) 750 to perform one or more actions. Accordingly, applications 762 can turn a general-purpose computer 702 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 762, and include one or more modules 764 and data 766 stored in memory and/or mass storage device (s) 750 whose functionality can be realized when executed by one or more processor(s) 720.

In accordance with one particular embodiment, the processor(s) 720 can correspond to a system on a chip (SOC) or like architecture including, or in other words integrating, both hardware and software on a single integrated circuit substrate. Here, the processor(s) 720 can include one or more processors as well as memory at least similar to processor(s) 720 and memory 730, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 702 also includes one or more interface components 770 that are communicatively coupled to the system bus 740 and facilitate interaction with the computer 702. By way of example, the interface component 770 can be a port (e.g., serial, parallel, PCMCIA, USB, FireWire, etc.) or an interface card (e.g., sound, video, etc.) or the like. In one example implementation, the interface component 770 can be embodied as a user input/output interface to enable a user to enter commands and information into the computer 702, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 770 can be embodied as an output peripheral interface to supply output to displays (e.g., LCD, LED, plasma, etc.), speakers, printers, and/or other computers, among other things. Still further yet, the interface component 770 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method, comprising:
creating a graph of a digital twins object model, the graph having physical space nodes representing physical spaces and sensor nodes representing sensors that are present within the physical spaces;
incorporating, into the graph, a function node representing a function, the function node having a subset of the sensor nodes that fall within a subtree of the function node;
based at least on a location of the function node in the graph, restricting access of the function represented by the function node to telemetry data provided by certain sensors represented by the subset of sensor nodes that fall within the subtree of the function node, wherein the restricting includes preventing the function from accessing other telemetry data provided by other sensors represented by other sensor nodes in the graph that do not fall within the subtree of the function node;
parsing sensor data associated with a particular sensor node in the subset to identify metadata associated with the particular sensor node, wherein the sensor data comprises particular telemetry data provided by the particular sensor node;
determining that the function matches the identified metadata associated with the particular sensor node;
providing the particular telemetry data to the function that is represented by the function node; and
executing the user defined function on the particular telemetry data.

2. The method of claim 1, wherein the graph comprises a spatial intelligence graph that defines a hierarchical relationship of objects of the digital twins object model.

3. The method of claim 1, wherein executing the function includes calculating a computed value based on the particular telemetry data.

4. The method of claim 3, wherein executing the function further includes modifying a topology of the digital twins object modelthe subtree of the function node, and wherein restricting the access of the function comprises preventing the function from modifying other topologies of other subtrees in the graph that are not subtrees of the function node.

5. The method of claim 4, wherein the function is a user-defined function, the method further comprising:
assigning an associated role that defines access rights of the user-defined function to the subset of sensor nodes that fall within the subtree of the function node,
wherein the restricting comprises permitting the user-defined function to modify the topology of the subtree and not the other topologies of the other subtrees based at least on the access rights defined by the associated role.

6. The method of claim 1 further comprising:
receiving information regarding business logic from a user defining the function;
receiving information regarding one or more telemetry conditions to which the function applies;
associating a matcher with the function node; and
by the matcher, invoking the function when the one or more telemetry conditions are met by the telemetry data provided by the certain sensors represented by the subset of sensor nodes that fall within the subtree of the function node.

7. A system, comprising:
a processor; and
a memory having computer-executable instructions stored thereupon which, when executed by the processor, cause the system to:
access a graph of a digital twins object model, the graph having physical space nodes representing physical spaces, sensor nodes representing sensors that are present within the physical spaces, and function nodes representing functions;
obtain particular telemetry data provided by a particular sensor that is represented by a particular sensor node of the graph, the particular sensor node being associated with particular metadata;
determine a particular function that matches the particular metadata associated with the particular sensor node, the particular function being represented in the graph by a particular function node;
based at least on a particular location of the particular function node in the graph, restrict access of the particular function to telemetry data provided by certain sensors represented by a subset of sensor nodes, including the particular sensor node, that fall within a particular subtree of the particular function node while preventing the particular function from accessing other telemetry data provided by other sensors represented by other sensor nodes in the graph that fall within other subtrees;
provide at least some of the particular telemetry data to the particular function that is represented by the particular function node; and
execute the particular function on the particular telemetry data.

8. The system of claim 7, wherein the graph comprises a spatial intelligence graph that defines a hierarchical relationship of objects of the digital twins object model.

9. The system of claim 7, wherein the computer-executable instructions, when executed by the processor, cause the system to:
cause the particular function to calculate a computed value based on the particular telemetry data.

10. The system of claim 9, wherein the computer-executable instructions, when executed by the processor, cause the system to:
cause the particular function to modify a topology of the subset of sensor nodes that fall within the particular subtree of the particular function node.

11. The system of claim 7, wherein computer-executable instructions, when executed by the processor, cause the system to:
assign, to the particular function, an associated role that defines access rights of the function to particular nodes of the graph that fall within the particular subtree.

12. A computer storage media storing computer-readable instructions that, when executed, cause a computing device to:
obtain a graph of a digital twins object model, the graph having physical space nodes representing physical spaces, sensor nodes representing sensors that are present within the physical spaces, and function nodes representing functions;

determine that a particular function represented by a particular function node matches particular metadata associated with a particular sensor node representing a particular sensor;

based at least on a particular location of the particular function node in the graph, restrict access of the particular function to telemetry data provided by certain sensors represented by a subset of sensor nodes, including the particular sensor node, that fall within a particular subtree of the particular function node while preventing the particular function from accessing other telemetry provided by other sensors represented by other sensor nodes in the graph that fall within other subtrees;

provide particular telemetry data generated by the particular sensor to the particular function; and cause the particular function to execute on the particular telemetry data.

13. The computer storage media of claim 12, wherein the graph comprises a spatial intelligence graph.

14. The computer storage media of claim 12, wherein the computer-readable instructions, when executed, cause the computing device to:

determine whether to execute the particular function based at least on a value present in the particular telemetry data.

15. The computer storage media of claim 12, wherein the particular function has an associated role that defines access rights of the particular function nodes to other nodes that fall within the particular subtree.

16. The method of claim 1, wherein executing the function involves controlling physical equipment based on the particular telemetry data.

17. The method of claim 16, wherein the physical equipment comprises heating, ventilation, or air conditioning equipment in a building represented in the digital twins object model.

18. The computer storage media of claim 12, wherein the computer-readable instructions, when executed, cause the computing device to:

based at least on other locations of other function nodes in the graph representing other functions, restrict access of the other functions to corresponding telemetry data provided by individual sensors represented by individual sensor nodes that fall within individual subtrees of the other function nodes while preventing the other functions from accessing further telemetry data provided by further sensors represented by further sensor nodes that do not fall within the individual subtrees.

19. The computer storage media of claim 12, wherein the computer-readable instructions, when executed, cause the computing device to:

based at least on other locations of other function nodes in the graph representing other functions, allow the other functions to modify respective topologies of other subtrees of the other function nodes while preventing the other functions modifying further topologies of further subtrees in the graph.

20. The computer storage media of claim 19, wherein the computer-readable instructions, when executed, cause the computing device to:

receive role assignments for the other functions, the role assignments being associated with a role-based access control system; and allow the other functions to modify the respective topologies of the other subtrees of the other function nodes while preventing the other functions from modifying the further topologies of the further subtrees in the graph based at least on the role assignments for the other functions.

21. The computer storage media of claim 20, wherein a specific role assignment allows a specific function to access a specific subtree representing a specific floor of a building and prevents the specific function from accessing other subtrees representing other floors of the building.

22. The computer storage media of claim 12, wherein the computer-readable instructions, when executed, cause the computing device to:

receive an application programming interface (API) call associating the particular telemetry data with the particular sensor; and cause the particular function to execute on the particular telemetry data responsive to receiving the API call.

* * * * *